United States Patent
Gold et al.

(10) Patent No.: US 11,420,279 B2
(45) Date of Patent: *Aug. 23, 2022

(54) METHOD OF SELECTIVELY BONDING BRAZE POWDERS TO A SURFACE

(71) Applicants: Rolls-Royce Corporation, Indianapolis, IN (US); Rolls-Royce North American Technologies Inc., Indianapolis, IN (US)

(72) Inventors: Matthew Gold, Carmel, IN (US); Greg Lopshire, McCordsville, IN (US); Carl Russo, Clayton, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 322 days.

This patent is subject to a terminal disclaimer.

(21) Appl. No.: 16/684,958

(22) Filed: Nov. 15, 2019

(65) Prior Publication Data
US 2021/0146461 A1 May 20, 2021

(51) Int. Cl.
*B23K 1/005* (2006.01)
*B23K 1/00* (2006.01)
(Continued)

(52) U.S. Cl.
CPC .......... *B23K 1/0056* (2013.01); *B23K 1/0018* (2013.01); *B23K 1/20* (2013.01);
(Continued)

(58) Field of Classification Search
CPC .......... B22F 3/1021; B22F 3/105; B22F 7/04; B22F 2007/042; B22F 10/28;
(Continued)

(56) References Cited

U.S. PATENT DOCUMENTS

| 4,475,959 A | 10/1984 | Liang et al. |
| 5,976,337 A | 11/1999 | Korinko et al. |

(Continued)

FOREIGN PATENT DOCUMENTS

| EP | 0 049 489 A1 | 4/1982 |
| EP | 1 987 903 A2 | 11/2008 |

(Continued)

OTHER PUBLICATIONS

Translation of EP-2860231-A1 (Year: 2015).*
(Continued)

*Primary Examiner* — Matthew P Travers
(74) *Attorney, Agent, or Firm* — Crowell & Moring LLP (57) ABSTRACT

A method for selectively adhering braze powders to a surface comprises applying a binder material to a surface, depositing a braze powder on the binder material, and then directing a laser beam onto the braze powder while the laser beam moves along a predetermined path relative to the surface. The laser beam selectively heats the braze powder and the binder material along the predetermined path such that the binder material is removed and the braze powder is sintered and bonded to the surface. Thus, a braze deposit is formed at one or more predetermined locations on the surface. After forming the braze deposit, excess braze powder and binder material, that is, the braze powder and binder material not selectively heated by the laser, are removed from the surface.

20 Claims, 5 Drawing Sheets

(51) Int. Cl.
    *B23P 15/04*     (2006.01)
    *B23K 1/20*     (2006.01)
    *B22F 7/04*     (2006.01)
    *B22F 3/105*     (2006.01)

(52) U.S. Cl.
    CPC ............... *B23P 15/04* (2013.01); *B22F 3/105* (2013.01); *B22F 2007/042* (2013.01)

(58) Field of Classification Search
    CPC ............ B23K 1/0018; B23K 1/0056; B23K 2101/001; B23K 1/20; B23P 15/04; B23P 2700/13; Y10T 29/4932; Y10T 29/49336–49339; Y10T 29/49885
    See application file for complete search history.

(56) References Cited

U.S. PATENT DOCUMENTS

| | | |
|---|---|---|
| 6,331,217 B1 | 12/2001 | Burke et al. |
| 2001/0001042 A1 | 5/2001 | Sinatra et al. |
| 2001/0013390 A1 | 8/2001 | Staubwasser |
| 2004/0169063 A1 | 9/2004 | Stueber et al. |
| 2004/0200887 A1 * | 10/2004 | Franchet ............. B23K 35/22 228/193 |
| 2008/0199718 A1 | 8/2008 | Sjodin et al. |
| 2012/0000967 A1 | 1/2012 | Bischof et al. |
| 2013/0343789 A1 | 12/2013 | Motoda et al. |
| 2015/0125281 A1 | 5/2015 | Georgieva et al. |
| 2015/0125334 A1 | 5/2015 | Uetani et al. |
| 2015/0184514 A1 | 7/2015 | Schmitt et al. |
| 2017/0008084 A1 | 1/2017 | Witney et al. |
| 2017/0246698 A1 | 8/2017 | Bruck |
| 2018/0080336 A1 | 3/2018 | Lin |
| 2018/0230584 A1 | 8/2018 | Lin et al. |
| 2021/0146462 A1* | 5/2021 | Lopshire .................. F01D 9/02 |

FOREIGN PATENT DOCUMENTS

| | | | |
|---|---|---|---|
| EP | 2860231 A1 * | 4/2015 | .......... B23K 35/025 |
| EP | 3 049 627 A1 | 8/2016 | |
| GB | 2 051 624 A | 1/1981 | |
| JP | 2019072772 A | 5/2019 | |
| WO | WO 2015/047698 A1 | 4/2015 | |

OTHER PUBLICATIONS

B.R. Garrett, G.F. Blank, and A.J. Ranadive, "Broad Applications of Diffusion Bonding," *NASA Contractor Report* (*Nasa CR-409*), National Aeronautics and Space Administration, Washington, DC, pp. 1-176, Mar. 1966.

* cited by examiner

METHOD OF SELECTIVELY BONDING BRAZE POWDERS TO A SURFACE

TECHNICAL FIELD

The present disclosure relates generally to applying braze powders to surfaces, and more particularly to a method of selectively sintering and adhering braze powders to one or more predetermined locations on a surface.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. In a conventional turbine compressor, turbine blades may be fabricated separately from the rotor disk and then mechanically assembled such the turbine blades extend from machined slots on the disk; however, this configuration has the disadvantage of discontinuities between the blades and the disk. To eliminate such discontinuities, diffusion bonding techniques have been developed to bond the turbine blades to the disk to form a mechanically robust, monolithic component (a "turbine blisk"). Diffusion bonding is a solid-state bonding method, where elevated temperatures and typically high pressures are employed to obtain diffusion of atoms between mating components, allowing for formation of a thermally-stable metallurgical bond. Various gas turbine engine components may benefit from diffusion bonding.

Diffusion bonding may be facilitated or improved by utilizing diffusion agents or braze materials, such as braze foils or powders, between the components to be joined. However, the bonding of components having complex surface geometries can present challenges with the use of such diffusion agents. For example, the use of braze foils may not be effective for irregular or discontinuous surfaces, and it may be difficult if not impossible to deposit consistent levels of braze powder on such surfaces using methods known in the art. In addition, conventional methods of braze powder application, which typically provide blanket surface coverage of costly braze alloys, may lead to waste and/or bonding problems when a braze deposit is needed only for selected areas.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

FIGS. 1A-1F illustrate a laser-based method for selectively sintering and adhering braze powders to a surface of a first component. The method may be useful to form a braze deposit at selected location(s) on the surface prior to diffusion bonding the first component to a second component, as discussed below.

Figure 1A:
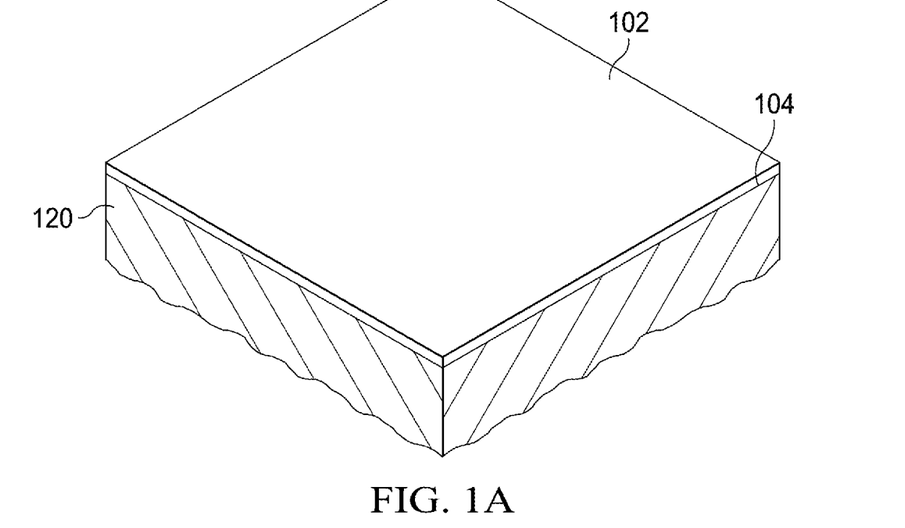
FIGS. 1A-1F are cross-sectional schematics illustrating a laser-based method of selectively sintering and bonding braze powders to a surface.

Referring to FIG. 1A, the method entails applying a binder material 102 to a surface 104. The binder material 102 may comprise a polymer or a polymer resin, and may be applied to the surface 104 by spraying, spin coating, dip coating, brushing, or rolling (e.g., with a roller or belt). The binder material 102 may take the form of a polymer resin when applied to the surface, and the polymer may be obtained upon curing or drying. Suitable binder materials 102 may comprise a water-absorbent polymer, which may in some cases be a superabsorbent polymer. In some examples, the binder material may comprise a cyanoacrylate polymer or an acrylic polymer. The binder material 102 may be applied to a thickness in a range from about 10 microns (0.01 mm) to 500 microns (0.5 mm), or more typically from about 50 microns (0.05 mm) to 250 microns (0.25 mm). Prior to applying the binder material 102, the surface 104 may undergo standard surface preparation procedures, such as cleaning and/or grinding, to remove contaminants such as dust, chemical residues, and oxides.

Figure 1B:
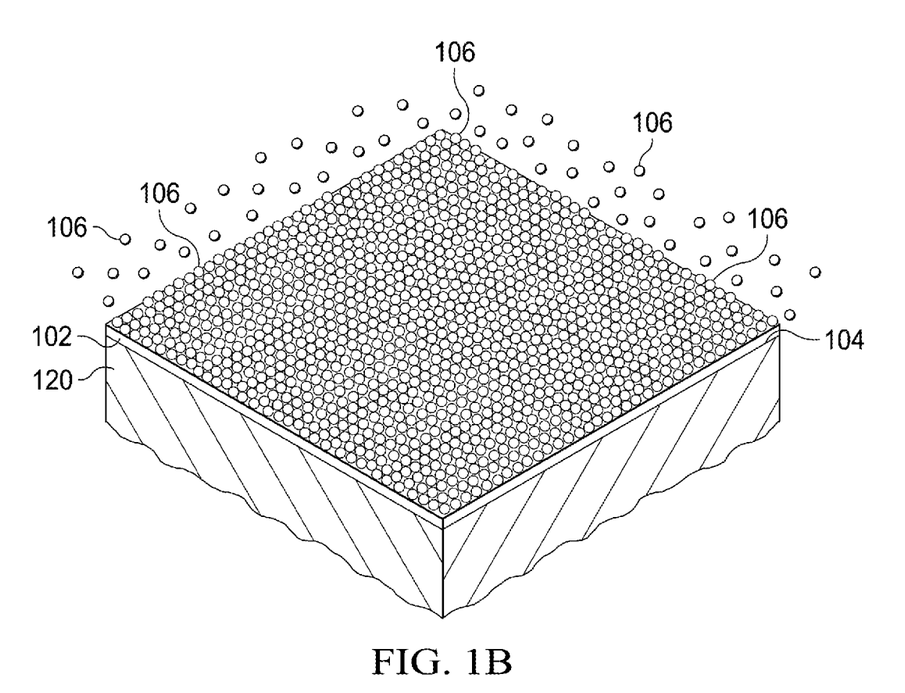

Next, referring to FIG. 1B, a braze powder 106 is deposited on the binder material 102. Typically, the braze powder 106, which comprises a metal alloy (or "braze alloy") as described below, is deposited on the binder material 102 by spraying, scattering, or dusting, and at least some fraction of the distributed braze powder 106 adheres to the binder material 102. Some or all of the binder material 102 may be completely covered by the braze powder 106 to ensure that adjacent particles of the braze powder 106 are in physical contact to facilitate sintering in the next step. The mass density of the braze powder 106 may lie in a range from about 0.04 g/in$^2$ to about 0.25 g/in$^2$, or in some cases from about 0.06 g/in$^2$ to about 0.08 g/in$^2$. A suitable weight ratio of the braze powder 106 to the binder material 102 may be from about 0.75 to about 0.98, or from about 0.90 to about 0.95.

Figure 1C:
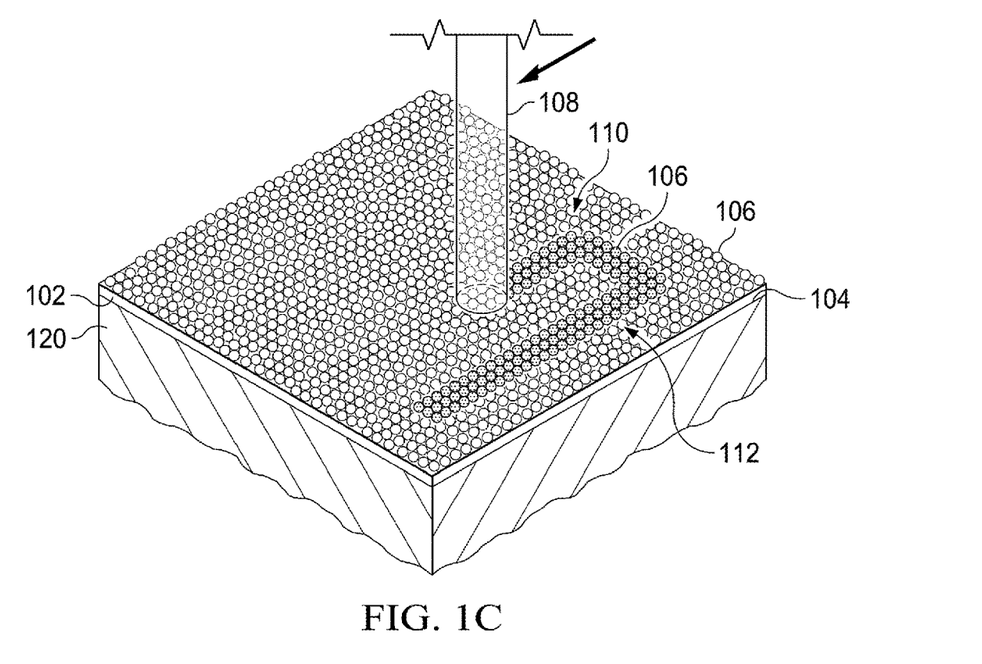
Figure 1D:
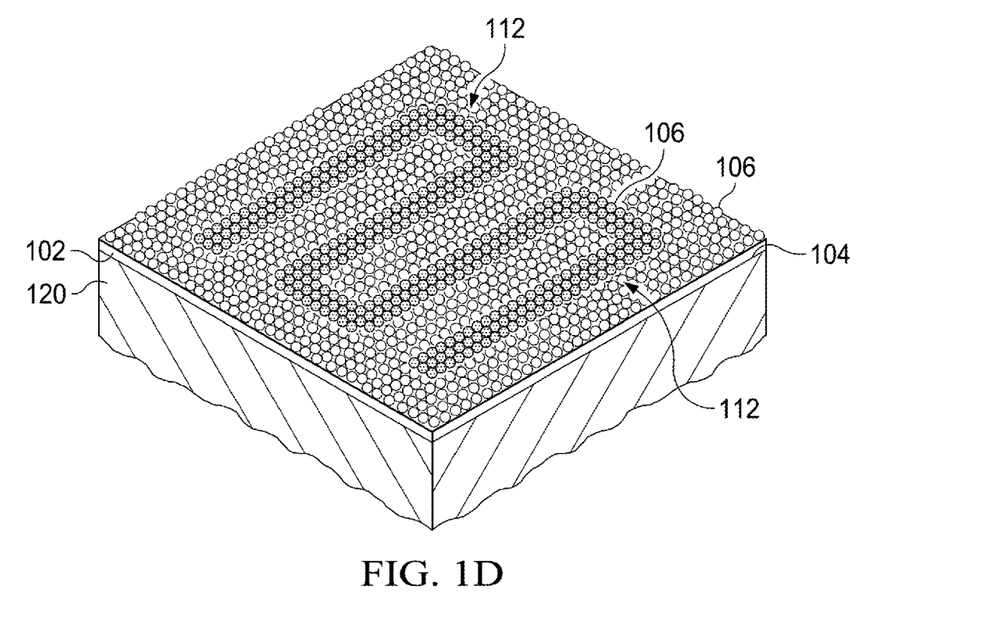

FIG. 1C illustrates the use of a laser to selectively sinter and adhere the braze powders to the surface 104. A laser beam 108 is directed onto the braze powder 106 while moving along a predetermined path 110 over the surface 104; consequently, the braze powder 106 and the binder material 102 within the predetermined path 110 are selectively heated. More specifically, only the braze powder 106 and the binder material 102 falling within the predetermined path 110 of the laser beam 108 are heated. This selective heating induces removal (e.g., by pyrolysis or vaporization) of the binder material 102 along the predetermined path 110, and the braze powder 106 is sintered and bonded to the surface 104, as illustrated in FIGS. 1C and 1D. Thus, a braze deposit 112 is formed at one or more predetermined locations on the surface 104.

Figure 1E:
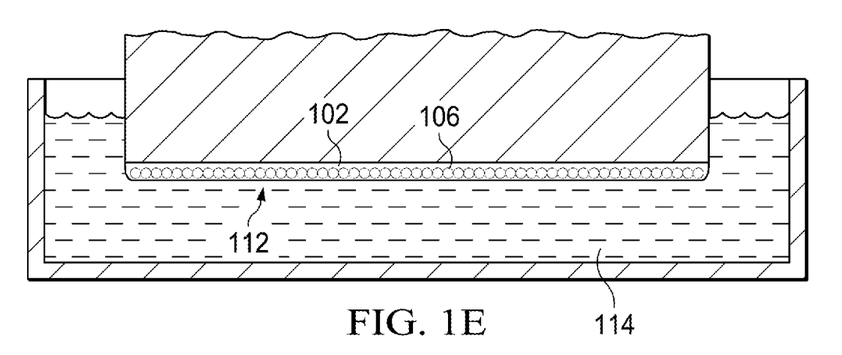
Figure 1F:
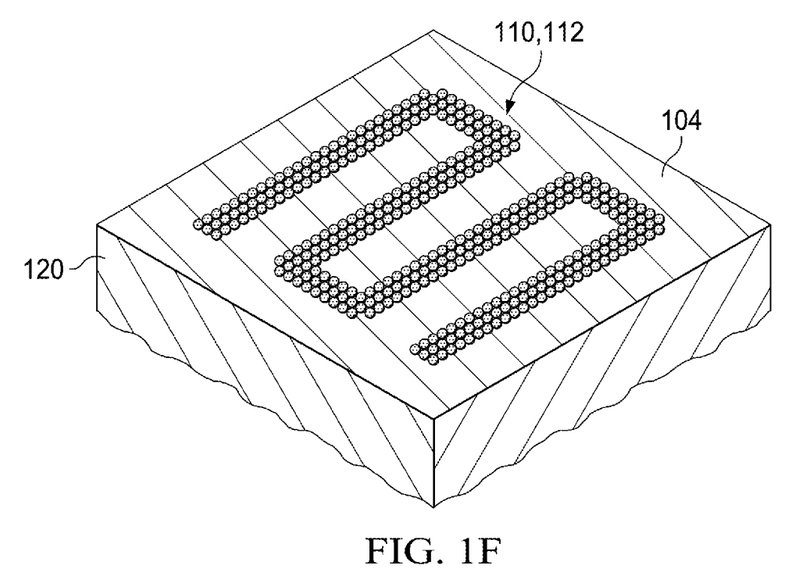

The method may further include, after forming the braze deposit 112, removing the braze powder 106 and binder material 102 from any portion of the surface 104 not along the predetermined path 110. In other words, the braze powder 106 and the binder material 102 that are not heated by the laser may be removed from the surface 104 after the braze deposit 112 is formed, leaving just the braze deposit 112 on the surface 104, as shown in FIG. 1F. The removal may entail washing the surface with a solvent 114 or otherwise exposing the surface to a solvent (e.g., by immersion or spraying), as illustrated in FIG. 1E. The solvent 114 may be selected based on its compatibility with the binder material 102. For example, if the binder material is soluble in water, the solvent may comprise an aqueous solvent. If the binder material 102 is insoluble in water, the solvent may comprise an organic solvent, such as acetone.

Returning to FIG. 1C, the predetermined path 110 may be a continuous path along the surface 104. Alternatively, the predetermined path may be a discontinuous path where the laser beam is operated intermittently (turned off and on) while moving. Similarly, the surface may be a continuous surface or a discontinuous surface that includes surface regions separated by gaps or holes. In the latter case, the laser beam may be operated intermittently to selectively heat the braze powder and binder material on the surface regions, thereby forming a braze deposit only on the surface regions.

It should be understood that references to the laser beam 108 moving over the surface 104 are intended to broadly describe relative motion between the laser beam 108 and the surface 104, and thus may encompass any of the following situations: (1) the laser beam 108 moving while the surface 104 remains stationary; (2) the laser beam 108 remaining stationary while the surface 104 moves; and/or (3) the laser beam 108 moving while the surface 104 also moves. The relative motion between the laser beam 108 and the surface 104 may be electronically controlled in three dimensions (along x- y- and/or z-axes), and the path 110 of the laser beam 108 may be programmed.

The laser beam may be generated by a commercially available laser such as a gas laser (e.g., $CO_2$ laser), a solid state laser (e.g., a Nd:YAG or Nd:$YVO_4$ laser), or a fiber laser. The laser beam may be a pulsed laser beam or a continuous laser beam. Advantageously, the laser beam is operated at a power level and scan rate sufficient to remove the binder material and sinter the braze powder without inducing melting. Accordingly, the binder material and braze powder along the predetermined path may be heated to a temperature sufficient to vaporize or pyrolyze the binder material but below a solidus of the braze powder, where the solidus is the highest temperature at which the braze powder is completely solid. For example, the temperature may be in a range from about 400° C. to about 800° C. A suitable power level for the laser beam may lie in a range from about 100 W to about 500 W, depending on the braze alloy. At higher power levels, the laser beam may be moved relative to the surface at a faster scan rate to control the heating.

As indicated above, the surface 104 is part of a first component 120 which may undergo diffusion bonding to a second component 122, as will be discussed below in reference to FIGS. 1G and 1H. Both the first and second components 120,122 may comprise a metal alloy which may be suitable for high temperature applications, such as a nickel-base alloy, a titanium-base alloy (e.g., a titanium aluminide), or an iron-base alloy.

The braze powder 106 comprises a metal alloy or braze alloy selected at least in part based on the metal alloy(s) present at mating surfaces of the first and second components 120,122. For example, the braze powder 106 may comprise a nickel-based braze alloy, a titanium based-braze alloy, or an iron-based braze alloy. Suitable nickel-based braze alloys may include nickel alloyed with boron, chromium, manganese, and/or silicon. Suitable titanium-based braze alloys may include titanium alloyed with copper, nickel and/or zirconium. Commercially available braze powder 106 may be employed. The braze powder 106 may include particles of a spheroidal, spherical, polygonal, elongated, irregular, or other morphology. Typically, the particles have a nominal size (e.g., width or diameter) in the range of tens or hundreds of microns.

Figure 1G:
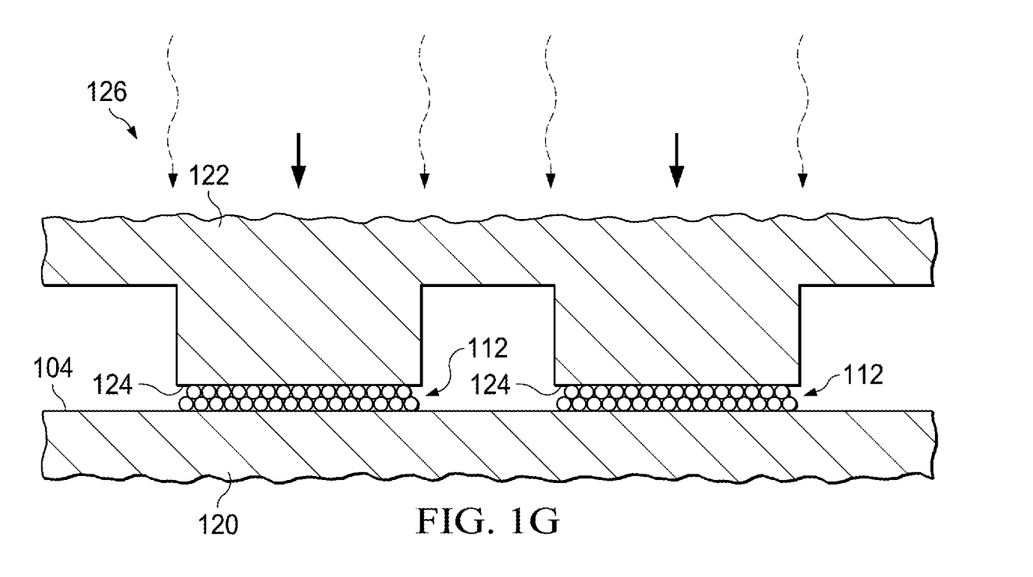
FIGS. 1G and 1H illustrate diffusion bonding of the surface to a mating surface.
Figure 1H:
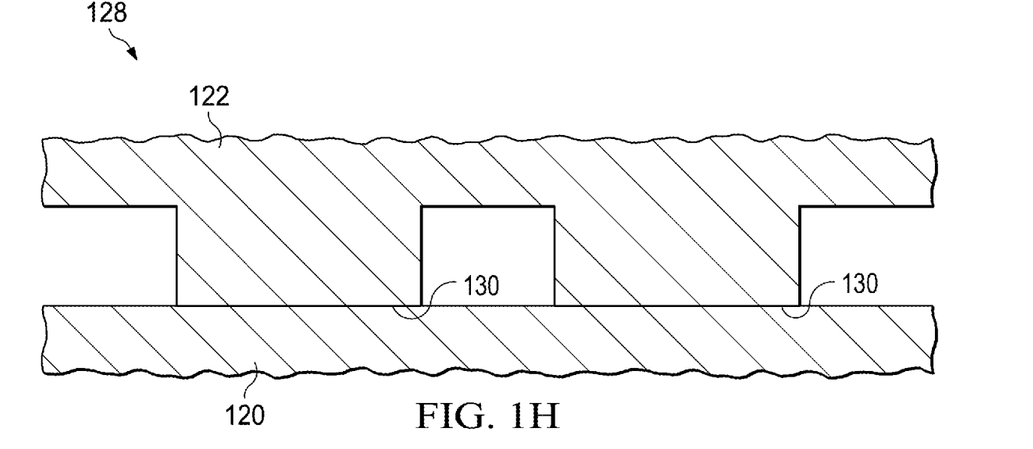

Referring to FIGS. 1G and 1H, a method of diffusion bonding comprises assembling a first component 120 comprising the surface 104 and braze deposit 112 described above with a second component 122 comprising a mating surface 124 to form an assembly 126, where the braze deposit 112 contacts the mating surface 124. The assembly 126 is exposed to a bonding temperature and a compressive force, preferably in a controlled environment such as a vacuum or inert gas atmosphere, and the first component 120 is diffusion bonded to the second component 122. Diffusion bonding may be carried out using methods known in the art. Typically, the bonding temperature lies in a range from about 900° C. (1650° F.) to about 1275° C. (2325° F.), or from about 1000° C. (1830° F.) to about 1100° C. (2010° F.), depending on the alloy(s) being bonded.

Once metallurgically bonded together, the first component 120 and the second component 122 form a monolithic third component 128 comprising a homogeneous bonded interface 130 that may be substantially free of unwanted phases, defects, and/or porosity, as shown in FIG. 1H. In one example, the monolithic third component 128 comprises an airfoil, as described below. The first and second components 120,122 may have a single-crystalline or polycrystalline (e.g., equiaxed) microstructure. In other words, the first component 120 may be single-crystalline or polycrystalline, and the second component 122 may be single-crystalline or polycrystalline. When both the first and second components 120,122 have a single-crystalline structure, a directionally solidified microstructure may be obtained across the bonded interface 130. The method is applicable to nickel-base alloys, iron-base alloys, and titanium-base alloys, such as titanium aluminides.

Figure 2:
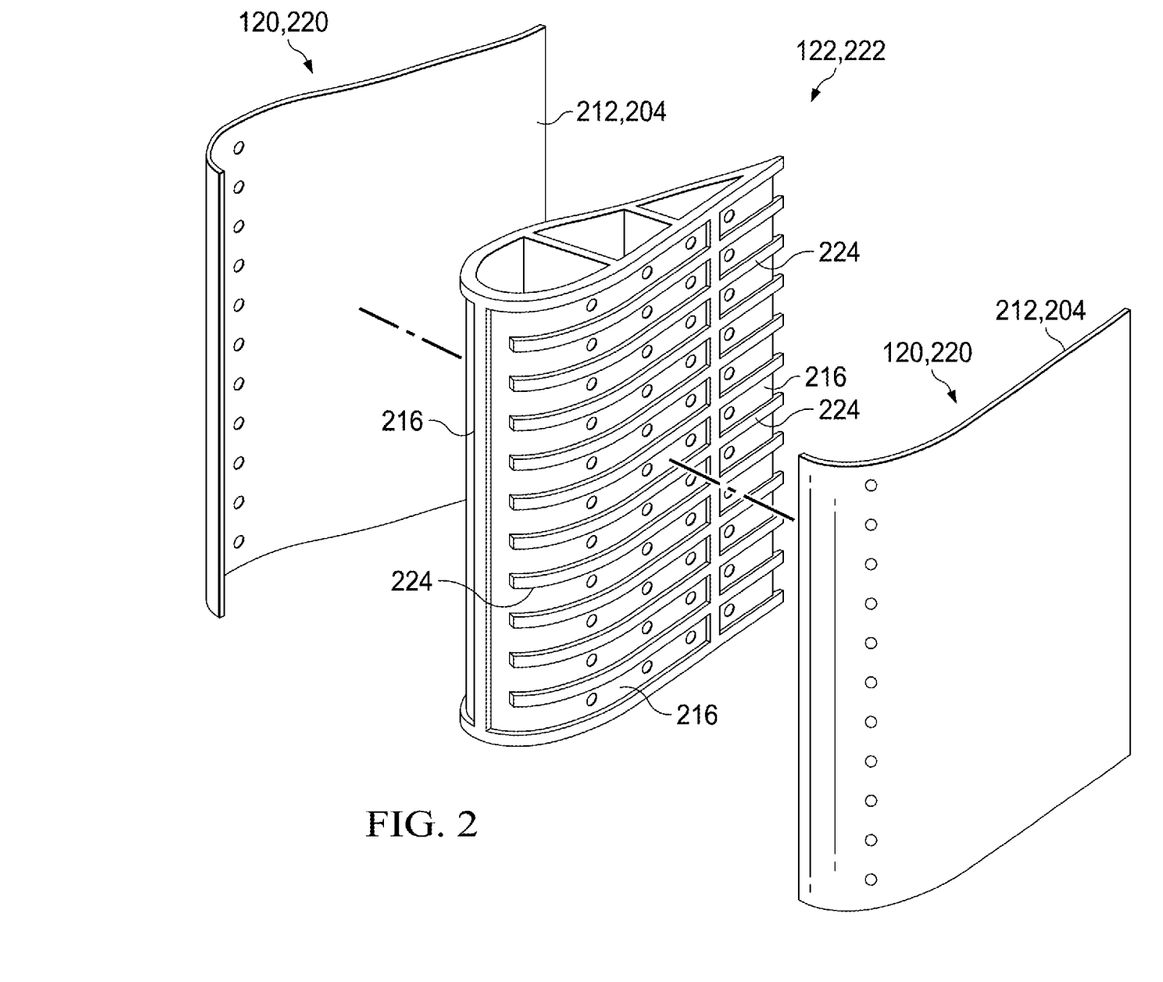
FIG. 2 shows an exemplary assembly for diffusion bonding comprising a spar and a cover sheet.

Referring now to FIG. 2, the first component 120 may be a coversheet 220 and the second component 122 may be a spar 222, which, when bonded together as described above, may form part or all of an airfoil with dual-wall cooling for use in a gas turbine engine. More specifically, the coversheet 220 may undergo the selective sintering process described above such that the braze powder is adhered only to predetermined locations on the surface 204. The spar 222 may include flow channels 216 alternating with raised surface features or "pedestals" 224 designed to mate with the braze deposit 212 on the surface 204 of the coversheet 220. The arrangement of the pedestals 224 and flow channels 216 shown in FIG. 2 is provided as an example only and is not intended to be limiting. Besides airfoils (e.g., turbine blades or vanes), the above-described method may be applicable to the fabrication of combustion liners, heat shields, and/or other gas turbine engine components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible.

Accordingly, the embodiments described herein are examples, not the only possible embodiments and implementations.

The subject-matter of the disclosure may also relate, among others, to the following aspects:

A first aspect relates to a method for selectively adhering braze powders to a surface, the method comprising: applying a binder material to a surface; depositing a braze powder on the binder material; directing a laser beam onto the braze powder while the laser beam moves along a predetermined path relative to the surface, the laser beam selectively heating the braze powder and the binder material along the predetermined path to remove the binder material and sinter and bond the braze powder to the surface, thereby forming a braze deposit at one or more predetermined locations on the surface; and, after forming the braze deposit, removing the braze powder and binder material not selectively heated by the laser from the surface.

A second aspect relates to the method of the first aspect, wherein the binder material is applied to the surface by spraying, spin coating, dip coating, brushing, or rolling.

A third aspect relates to the method of the first or second aspect, wherein the binder material applied to the surface has a thickness in a range from about 0.01 mm to about 1 mm.

A fourth aspect relates to the method of any preceding aspect, wherein, during the selective heating, the binder material along the predetermined path is removed by pyrolysis or vaporization.

A fifth aspect relates to the method of any preceding aspect, wherein the braze powder and the binder material are removed from the surface after forming the braze deposit by exposing the surface to a solvent.

A sixth aspect relates to the method of the fifth aspect, wherein the exposure to the solvent comprises washing, immersion, or spraying.

A seventh aspect relates to the method of any preceding aspect, wherein the predetermined path is a continuous path.

An eighth aspect relates to the method of any preceding aspect, wherein the predetermined path is a discontinuous path, the laser beam being operated intermittently while moving.

A ninth aspect relates to the method of any preceding aspect, wherein the surface is a discontinuous surface comprising surface regions separated by gaps, and wherein the braze deposit is formed on the surface regions.

A tenth aspect relates to the method of any preceding aspect, wherein depositing the braze powder comprises spraying, scattering, or dusting the braze powder over the binder material, at least some fraction of the braze powder adhering to the binder material.

An eleventh aspect relates to the method of any preceding aspect, wherein the laser beam is generated by a laser selected from the group consisting of: gas laser, solid state laser, and fiber laser.

A twelfth aspect relates to the method of any preceding aspect, wherein the laser beam is a pulsed laser beam.

A thirteenth aspect relates to a method of any preceding aspect, wherein the laser beam is a continuous laser beam.

A fourteenth aspect relates to the method of any preceding aspect, wherein the laser beam is operated at a power level and a scan rate sufficient to remove the binder material and sinter the braze powder without melting the braze powder.

A fifteenth aspect relates to the method of any preceding aspect, wherein the binder material and the braze powder along the predetermined path are selectively heated to a temperature in a range from about 400° C. to about 800° C.

A sixteenth aspect relates to the method of any preceding aspect, wherein the surface is part of a first component comprising a metal alloy.

A seventeenth aspect relates to the method of any preceding aspect, wherein the first component comprises part of an airfoil, a combustion liner, or a heat shield of a gas turbine engine.

An eighteenth aspect relates to the method of any preceding aspect, wherein the braze powder comprises a nickel-based braze alloy, a titanium based-braze alloy, or an iron-based braze alloy.

A nineteenth aspect relates to a method of diffusing bonding comprising the method of any preceding aspect, wherein the surface is a first surface, and further comprising, after forming the braze deposit, assembling a first component comprising the first surface with a second component comprising a mating surface to form an assembly, the braze deposit on the first surface contacting the mating surface; and exposing the assembly to a bonding temperature and a compressive force, thereby diffusion bonding the first component to the second component to form a monolithic third component comprising a bonded interface.

A twentieth aspect relates to the method of the nineteenth aspect, wherein the first component comprises a coversheet and the second component comprises a spar, the monolithic third component comprising an airfoil for use in a gas turbine engine.

In addition to the features mentioned in each of the independent aspects enumerated above, some examples may show, alone or in combination, the optional features mentioned in the dependent aspects and/or as disclosed in the description above and shown in the figures.

What is claimed is:

1. A method for selectively adhering braze powders to a surface, the method comprising:
    applying a binder material to a surface;
    depositing a braze powder on the binder material;
    directing a laser beam onto the braze powder while the laser beam moves along a predetermined path relative to the surface, the laser beam selectively heating the braze powder and the binder material along the predetermined path to remove the binder material and sinter and bond the braze powder to the surface, thereby forming a braze deposit at one or more predetermined locations on the surface, wherein a portion of the braze powder and the binder material are not selectively heated by the laser; and
    after forming the braze deposit, removing the portion of the braze powder and the binder material not selectively heated by the laser from the surface.

2. The method of claim 1, wherein the binder material is applied to the surface by spraying, spin coating, dip coating, brushing, or rolling.

3. The method of claim 1, wherein the binder material applied to the surface has a thickness in a range from 0.01 mm to 1 mm.

4. The method of claim 1, wherein, during the selective heating, the binder material along the predetermined path is removed by pyrolysis or vaporization.

5. The method of claim 1, wherein the braze powder and the binder material are removed from the surface after forming the braze deposit by exposing the surface to a solvent.

6. The method of claim 5, wherein the exposure to the solvent comprises washing, immersion, or spraying.

7. The method of claim 1, wherein the predetermined path is a continuous path.

8. The method of claim 1, wherein the predetermined path is a discontinuous path, the laser beam being operated intermittently while moving.

9. The method of claim 1, wherein the surface is a discontinuous surface comprising surface regions separated by gaps, and wherein the braze deposit is formed on the surface regions.

10. The method of claim 1, wherein depositing the braze powder comprises spraying, scattering, or dusting the braze powder over the binder material, at least some fraction of the braze powder adhering to the binder material.

11. The method of claim 1, wherein the laser beam is generated by a laser selected from the group consisting of: gas laser, solid state laser, and fiber laser.

12. The method of claim 1, wherein the laser beam is a pulsed laser beam.

13. The method of claim 1, wherein the laser beam is a continuous laser beam.

14. The method of claim 1, wherein the laser beam is operated at a power level and a scan rate sufficient to remove the binder material and sinter the braze powder without melting the braze powder.

15. The method of claim 1, wherein the binder material and the braze powder along the predetermined path are selectively heated to a temperature in a range from 400° C. to 800° C.

16. The method of claim 1, wherein the surface is part of a first component comprising a metal alloy.

17. The method of claim 1, wherein the first component comprises part of an airfoil, a combustion liner, or a heat shield of a gas turbine engine.

18. The method of claim 1, wherein the braze powder comprises a nickel-based braze alloy, a titanium based-braze alloy, or an iron-based braze alloy.

19. A method of diffusion bonding comprising:
the method of claim 1, wherein the surface is a first surface, and further comprising, after forming the braze deposit, assembling a first component comprising the first surface with a second component comprising a mating surface to form an assembly, the braze deposit on the first surface contacting the mating surface; and
exposing the assembly to a bonding temperature and a compressive force, thereby diffusion bonding the first component to the second component to form a monolithic third component comprising a bonded interface.

20. The method of claim 19, wherein the first component comprises a coversheet and the second component comprises a spar, the monolithic third component comprising an airfoil for use in a gas turbine engine.

* * * * *

UNITED STATES PATENT AND TRADEMARK OFFICE
CERTIFICATE OF CORRECTION

| | | |
|---|---|---|
| PATENT NO. | : 11,420,279 B2 | Page 1 of 1 |
| APPLICATION NO. | : 16/684958 | |
| DATED | : August 23, 2022 | |
| INVENTOR(S) | : Matthew Gold, Greg Lopshire and Carl Russo | |

It is certified that error appears in the above-identified patent and that said Letters Patent is hereby corrected as shown below:

In the Claims

Column 8, Line 3, Claim 17, delete "1" and replace with --16--

Signed and Sealed this
Eighteenth Day of October, 2022

Katherine Kelly Vidal
*Director of the United States Patent and Trademark Office*